US012560219B2

(12) United States Patent　　　　　　(10) Patent No.: US 12,560,219 B2
Matsuoka　　　　　　　　　　　　　　　(45) Date of Patent: Feb. 24, 2026

(54) DRIVE UNIT AND TRANSMISSION DEVICE

(71) Applicant: EXEDY Corporation, Neyagawa (JP)

(72) Inventor: Yoshihiro Matsuoka, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 0 days.

(21) Appl. No.: 19/094,832

(22) Filed: Mar. 29, 2025

(65) Prior Publication Data

US 2025/0314286 A1　　　Oct. 9, 2025

(30) Foreign Application Priority Data

Apr. 8, 2024　　(JP) ................................. 2024-062156

(51) Int. Cl.
　　　*F16H 3/54*　　　(2006.01)
　　　*B60K 1/00*　　　(2006.01)
　　　*B60K 17/02*　　(2006.01)
　　　*F16D 3/12*　　　(2006.01)
　　　*F16H 1/28*　　　(2006.01)
(52) U.S. Cl.
　　　CPC ................. *F16H 1/28* (2013.01); *B60K 1/00*
　　　　(2013.01); *B60K 17/02* (2013.01); *F16D 3/12*
　　　　　　　　　　　　　　　　　　　　　(2013.01)
(58) Field of Classification Search
　　　CPC ...... F16H 3/54; B60K 2001/001; B60K 17/26
　　　See application file for complete search history.

(56) References Cited

U.S. PATENT DOCUMENTS

| | | | | | |
|---|---|---|---|---|---|
| 4,674,612 | A | * | 6/1987 | Ogura | F16H 3/54 192/81 C |
| 6,093,128 | A | * | 7/2000 | Seith | F16H 3/54 475/258 |
| 6,363,807 | B1 | * | 4/2002 | Takahashi | F16D 43/30 192/109 D |
| 8,469,855 | B2 | * | 6/2013 | Phillips | F16H 61/0295 475/318 |
| 11,091,021 | B2 | * | 8/2021 | Bando | F16H 1/36 |
| 2002/0173399 | A1 | * | 11/2002 | Kumagai | F16H 61/70 475/218 |
| 2003/0104900 | A1 | * | 6/2003 | Takahashi | B60W 20/11 475/5 |

(Continued)

FOREIGN PATENT DOCUMENTS

| | | | | |
|---|---|---|---|---|
| DE | 102010060788 A1 | * | 5/2012 | .......... F02N 15/022 |
| JP | H09210149 A | | 8/1997 | |

*Primary Examiner* — Stacey A Fluhart
(74) *Attorney, Agent, or Firm* — United IP Counselors, LLC

(57)　　　　　　　ABSTRACT

A planetary gear mechanism includes a sun gear, a planet gear, a ring gear, and a planet carrier. An input member couples an electric motor to the ring gear or the sun gear. An output member is coupled to the planet carrier. A first clutch couples/decouples the input member and the output member. A selectable one-way clutch is disposed between a stationary member and the other of the ring gear and the sun gear. In a first operating mode, the selectable one-way clutch allows the other of the ring gear and the sun gear to rotate in a forward moving direction but prevents the other of the ring gear and the sun gear from rotating in a rearward moving direction. In a second operating mode, the selectable one-way clutch prevents the other of the ring gear and the sun gear from rotating in the forward moving direction.

7 Claims, 8 Drawing Sheets

(56) References Cited

U.S. PATENT DOCUMENTS

| | | | | |
|---|---|---|---|---|
| 2004/0173174 A1* | 9/2004 | Sugino | ................... | F02N 15/08 |
| | | | | 290/31 |
| 2018/0208181 A1* | 7/2018 | Schneider | ............. | B60W 20/40 |
| 2019/0301581 A1* | 10/2019 | Matsuoka | .............. | F16H 45/02 |
| 2019/0305698 A1* | 10/2019 | Matsuoka | ............. | H02K 7/116 |

* cited by examiner

100

2    3    4    102

101

5

DRIVE UNIT AND TRANSMISSION DEVICE

CROSS-REFERENCE TO RELATED APPLICATIONS

This application is based on and claims the priority benefit of application No. 2024-062156 filed on Apr. 8, 2024, the contents of which are incorporated herein by reference.

TECHNICAL FIELD

The claimed invention relates to a drive unit and a transmission device.

BACKGROUND

A transmission device described in Japan Laid-open Patent Application Publication No. H09-210149 is configured to transmit mechanical power from an internal combustion engine to a drive wheel, while the mechanical power is changed in rotational speed. Specifically, the transmission device includes a first clutch, a second clutch, and a planetary gear mechanism. The transmission device is switched in gear ratio by switching the states of the first and second clutches by hydraulic pressure.

SUMMARY OF THE INVENTION

When employing the transmission device configured as described above, it is desirable for a drive unit including an electric motor as a drive source to have reduced energy consumption. In view of this, it is an object of embodiments of the claimed invention to reduce energy consumption.

A drive unit according to a first aspect includes an electric motor, a planetary gear mechanism, an input member, an output member, a first clutch, a stationary member, and a selectable one-way clutch. The planetary gear mechanism includes a sun gear, a planet gear, a ring gear, and a planet carrier. The input member couples the electric motor and one of the ring gear and the sun gear therethrough to each other. The output member is coupled to the planet carrier. The first clutch couples the input member and the output member therethrough to each other in a manner capable of decoupling the input member and the output member therethrough from each other. The stationary member is disposed to be non-rotatable. The selectable one-way clutch is disposed between the stationary member and the other of the ring gear and the sun gear. The selectable one-way clutch operates in a first operating mode and a second operating mode. The selectable one-way clutch is configured to allow the other of the ring gear and the sun gear to rotate in a forward moving rotational direction but prevent the other of the ring gear and the sun gear from rotating in a rearward moving rotational direction when operating in the first operating mode. The selectable one-way clutch is configured to prevent the other of the ring gear and the sun gear from rotating in the forward moving rotational direction when operating in the second operating mode.

According to this configuration, in forward traveling, when the selectable one-way clutch is caused to operate in the first operating mode, the other of the ring gear and the sun gear can be prevented from rotating in low-speed traveling. On the other hand, in rearward traveling, when the selectable one-way clutch is caused to operate in the second operating mode, the other of the ring gear and the sun gear can be prevented from rotating. Thus, with the selectable one-way clutch herein used, a hydraulic pressure is not required for preventing the other of the ring gear and the sub gear from rotating; hence, it is made possible to reduce energy consumption.

A drive unit according to a second aspect relates to the drive unit according to the first aspect and is configured as follows. The first clutch is a centrifugal clutch.

A drive unit according to a third aspect relates to the drive unit according to the second aspect and is configured as follows. The input member is disposed radially outside the output member. The first clutch includes a centrifugal element and an engaged groove. The centrifugal element is rotated unitarily with the output member. The centrifugal element is disposed to be radially movable with respect to the output member. The engaged groove is provided on an inner peripheral surface of the input member. The engaged groove is configured to be engaged with the centrifugal element.

A drive unit according to a fourth aspect relates to the drive unit according to the third aspect and is configured as follows. The first clutch further includes a magnet. The magnet is disposed radially inside the centrifugal element and attracts the centrifugal element by a magnetic force.

A drive unit according to a fifth aspect relates to the drive unit according to the third or fourth aspect and is configured as follows. The engaged groove includes a pair of inner wall surfaces circumferentially opposed to each other. At least one of the pair of inner wall surfaces slants radially inward to gradually separate from the other of the pair of inner wall surfaces.

A drive unit according to a sixth aspect relates to the drive unit according to any of the first to fifth aspects and is configured as follows. The input member includes a first input portion, a second input portion, and an elastic member elastically coupling the first and second input portions therethrough to each other.

A drive unit according to a seventh aspect relates to the drive unit according to any of the first to sixth aspects and further includes a controller. The controller executes a forward traveling mode and a rearward traveling mode. The controller causes the electric motor to rotate in a forward moving rotational direction and causes the selectable one-way clutch to operate in the first operating mode when executing the forward traveling mode. The controller causes the electric motor to rotate in the rearward moving rotational direction and causes the selectable one-way clutch to operate in the second operating mode when executing the rearward traveling mode.

A transmission device according to an eighth aspect is configured to change a rotational speed of a mechanical power transmitted thereto from an electric motor. The transmission device includes a planetary gear mechanism, an input member, an output member, a first clutch, a stationary member, and a selectable one-way clutch. The planetary gear mechanism includes a sun gear, a planet gear, a ring gear, and a planet carrier. The input member couples the electric motor and one of the ring gear and the sun gear therethrough to each other. The output member is coupled to the planet carrier. The first clutch couples the input member and the output member therethrough to each other in a manner capable of decoupling the input member and the output member therethrough from each other. The stationary member is disposed to be non-rotatable. The selectable one-way clutch is disposed between the stationary member and the other of the ring gear and the sun gear. The selectable one-way clutch operates in a first operating mode and a second operating mode. The selectable one-way clutch is configured to allow the other of the ring gear and the sun gear to rotate in a forward moving rotational direction but prevent the other of the ring gear and the sun gear from rotating in a rearward moving rotational direction when operating in the first operating mode. The selectable one-way clutch is configured to allow the other of the ring gear and the sun gear to rotate in the rearward moving rotational direction but prevent the other of the ring gear and the sun gear from rotating in the forward moving rotational direction when operating in the second operating mode.

Overall, according to the claimed invention, it is made possible to reduce energy consumption.

DETAILED DESCRIPTION

An embodiment of a drive unit 100 in accordance with the claimed invention will be hereinafter explained with reference to drawings. It should be noted that in the following explanation, the term "axial direction" refers to an extending direction of a rotational axis O of a transmission device 4. On the other hand, the term "circumferential direction" refers to a circumferential direction of an imaginary circle about the rotational axis O, whereas the term "radial direction" refers to a radial direction of the imaginary circle about the rotational axis O. Yet on the other hand, the term "forward moving rotational direction" refers to a direction in which a member for transmitting a torque (an electric motor 2, the transmission device 4, etc.) is rotated when a vehicle, in which the drive unit 100 is installed, is moved forward, whereas the term "rearward moving rotational direction" refers to a direction in which the member for transmitting the torque is rotated when the vehicle is moved rearward.

Drive Unit

Figure 1:
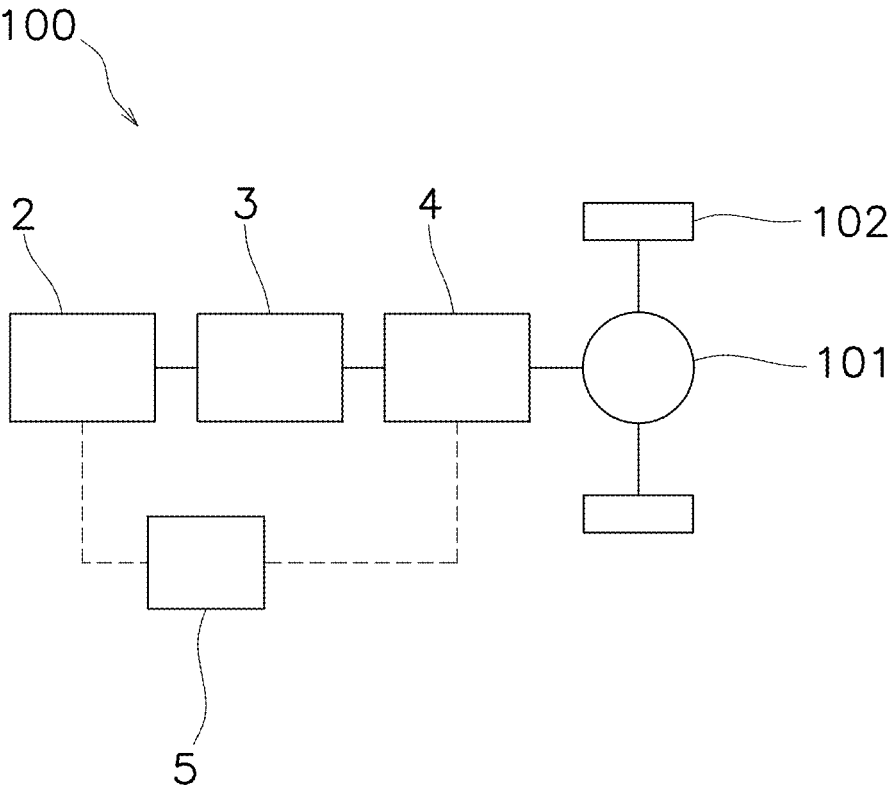
FIG. 1 is a block diagram of a drive unit.

As shown in FIG. 1, the drive unit 100 includes the electric motor 2, a reducer 3, the transmission device 4, and a controller 5. Torque, outputted from the drive unit 100, is transmitted to a drive wheel 102 via a differential gear 101. The drive unit 100 may be installed, for instance, in an electric car. It should be noted that the drive unit 100 might not include the reducer 3.

Electric Motor

The electric motor 2 is configured to rotate in both the forward moving rotational direction and the rearward moving rotational direction. When the vehicle moves forward, the electric motor 2 rotates in the forward moving rotational direction. On the other hand, when the vehicle moves rearward, the electric motor 2 rotates in the rearward moving rotational direction.

Reducer

The reducer 3 is disposed between the electric motor 2 and the transmission device 4 in a torque transmission path. The reducer 3 outputs mechanical power, outputted thereto from electric motor 2, to the transmission device 4, while the mechanical power is reduced in rotational speed. The reducer 3 includes, for instance, a plurality of gears (omitted in illustration).

Transmission Device

The transmission device 4 outputs the mechanical power, transmitted thereto from the electric motor 2, to the drive wheel 102 side, while the mechanical power is changed in rotational speed. The transmission device 4 is configured to change a gear ratio in a stepwise manner. It should be noted that in the presently preferred embodiment, the transmission device 4 is configured to change the gear ratio in two stages.

Figure 2:
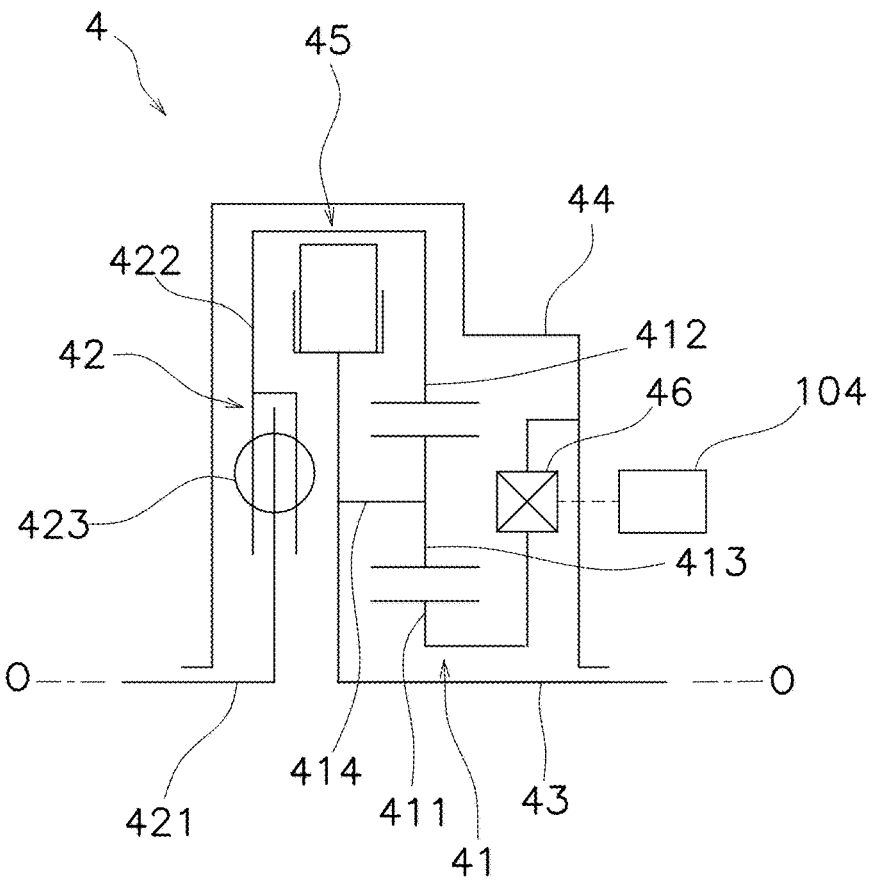
FIG. 2 is a schematic diagram of a transmission device.

As shown in FIG. 2, the transmission device 4 includes a planetary gear mechanism 41, an input member 42, an output member 43, a stationary housing 44 (exemplary stationary member), a first clutch 45, and a selectable one-way clutch 46.

Planetary Gear Mechanism

Figure 3:
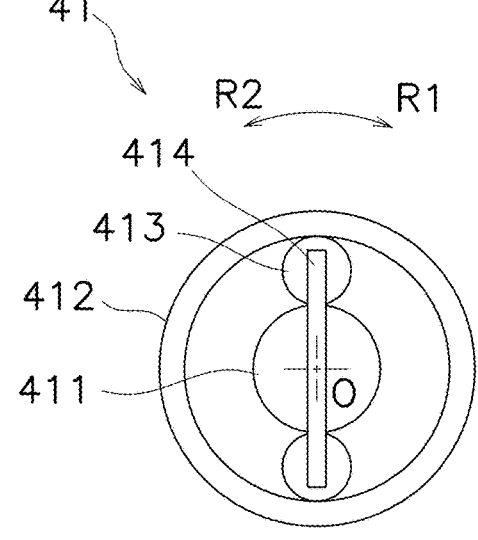
FIG. 3 is a front view of a planetary gear mechanism.

FIG. 3 is a front view of the planetary gear mechanism 41. As shown in FIG. 3, the planetary gear mechanism 41 includes a sun gear 411, a ring gear 412, a plurality of planet gears 413, and a planet carrier 414. The sun gear 411 is rotatable about the rotational axis O. The ring gear 412 has an annular shape. The ring gear 412 is an internal gear. The ring gear 412 encloses the sun gear 411. The ring gear 412 rotatable about the rotational axis O.

The planet gears 413 are disposed radially between the sun gear 411 and the ring gear 412. Each planet gear 413 is meshed with the sun gear 411 and the ring gear 412. Each planet gear 413 revolves about the rotational axis O. Additionally, each planet gear 413 is rotatable about the rotational axis thereof. The planet carrier 414 is attached to the planet gears 413. The planet carrier 414 is rotatable about the rotational axis O.

When the drive unit 100 moves the vehicle forward, the planetary gear mechanism 41 (in particular, the ring gear 412 and the planet carrier 414) is rotated in the forward moving rotational direction (R1). By contrast, when the drive unit 100 moves the vehicle rearward, the planetary gear mechanism 41 (in particular, the ring gear 412 and the planet carrier 414) is rotated in the rearward moving rotational direction (R2).

As illustrated schematically in FIG. 2, the input member 42 couples the electric motor 2 and the ring gear 412 therethrough to each other. When described in detail, the input member 42 couples the reducer 3 and the ring gear 412 therethrough to each other. The input member 42 is rotated unitarily with the ring gear 412. The input member 42 is configured to receive torque transmitted thereto from the electric motor 2. Additionally, the input member 42 is configured to transmit the torque to the ring gear 412.

The input member 42 includes a first input portion 421, a second input portion 422, and a plurality of elastic members 423. The first input portion 421 receives the torque transmitted thereto from the electric motor 2. The second input portion 422 transmits the torque to the ring gear 412.

The elastic members 423 elastically couple the first input portion 421 and the second input portion 422 therethrough to each other. In other words, torque transmission is made between the first and second input portions 421 and 422 through the elastic members 423.

The output member 43 is coupled to the planet carrier 414. The output member 43 is rotated unitarily with the planet carrier 414. The output member 43 is rotatable about the rotational axis O. The output member 43 penetrates the sun gear 411 to extend in the axial direction.

The output member 43 receives the torque from the planetary gear mechanism 41 and transmits the received torque to the drive wheel 102 side. When described in detail, the output member 43 transmits the torque to the differential gear 101.

Stationary Housing

The stationary housing 44 is non-rotatable. The stationary housing 44 is fixed to a vehicle frame or so forth. The stationary housing 44 accommodates the planetary gear mechanism 41, the first clutch 45, and the selectable one-way clutch 46.

First Clutch

The first clutch 45 couples the input member 42 and the output member 43 therethrough to each other in a manner capable of decoupling the input member 42 and the output member 43 therethrough from each other. The first clutch 45 is configured to couple the input member 42 and the output member 43 therethrough to each other (this state will be hereinafter referred to as "an engaged state") and to decouple the input member 42 and the output member 43 therethrough from each other (this state will be hereinafter referred to as "a disengaged state"). It should be noted that the first clutch 45 may be of a normally opened type. In other words, the first clutch 45 is turned to the disengaged state in a neutral condition that the drive unit 100 is not being actuated.

When the first clutch 45 is turned to the engaged state, the input member 42 and the output member 43 are coupled to each other and are rotated unitarily with each other. On the other hand, when the first clutch 45 is turned to the disengaged state, the input member 42 and the output member 43 are decoupled from each other and are made rotatable relative to each other.

Figure 4:
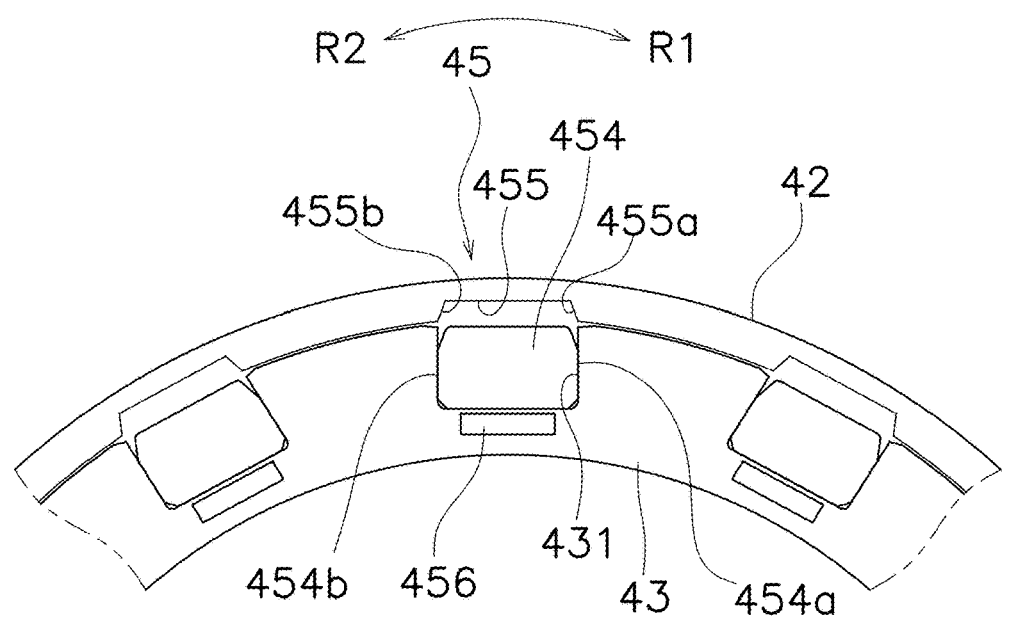
FIG. 4 is an enlarged view of a portion of a first clutch (set in a disengaged state).

As shown in FIG. 4, the first clutch 45 may be a centrifugal clutch. In other words, the first clutch 45 is configured to engage the input member 42 and the output member 43 therethrough with each other, when centrifugal forces are generated by rotation of the output member 43. The first clutch 45 includes a plurality of centrifugal elements 454, a plurality of engaged grooves 455, and a plurality of magnets 456.

The configuration of the first clutch 45 will be explained in detail as follows. First, the input member 42 is disposed radially outside the output member 43. The engaged grooves 455 are provided on the inner peripheral surface of the input member 42. The engaged grooves 455 face radially inward. The engaged grooves 455 are spaced apart from each other at intervals in the circumferential direction. The engaged grooves 455 are configured to be engaged with the centrifugal elements 454, respectively.

Each engaged groove 455 is defined in part by a pair of inner wall surfaces 455a and 455b that slants radially inwardly to gradually separate from each other. The inner wall surfaces 455a and 455b are opposed to each other in the circumferential direction. It should be noted that at only one of the pair of inner wall surfaces 455a and 455b might slant.

The output member 43 includes a plurality of accommodation portions 431. The accommodation portions 431 are opened radially outwardly. In other words, the accommodation portions 431 are provided on the outer peripheral surface of the output member 43. The accommodation portions 431 are spaced apart from each other at intervals in the circumferential direction. Preferably, the interval between each adjacent pair of accommodation portions 431 is identical to that between each adjacent pair of engaged grooves 455.

The centrifugal elements 454 are accommodated in the accommodation portions 431, respectively. The centrifugal elements 454 are rotated unitarily with the output member 43. Additionally, each centrifugal element 454 is radially movable within each accommodation portion 431. Each centrifugal element 454 is magnetized.

Each centrifugal element 454 includes a pair of lateral surfaces 454a and 454b facing in the circumferential direction. When each centrifugal element 454 is moved radially outward and is engaged with each engaged groove 455, the pair of lateral surfaces 454a and 454b is opposed in part to the pair of inner wall surfaces 455a and 455b. The portions of the pair of lateral surfaces 45a and 45b, opposed to the pair of inner wall surfaces 455a and 455b, slants along the pair of inner wall surfaces 455a and 455b.

The magnets 456 are disposed radially inside the centrifugal elements 454, respectively. The magnets 456 are attached to the output member 43. The magnets 456 are disposed radially inside the accommodation portions 431, respectively. For example, the magnets 456 are embedded in the output member 43. Each magnet 456 attracts each centrifugal element 454 by a magnetic force.

Figure 5:
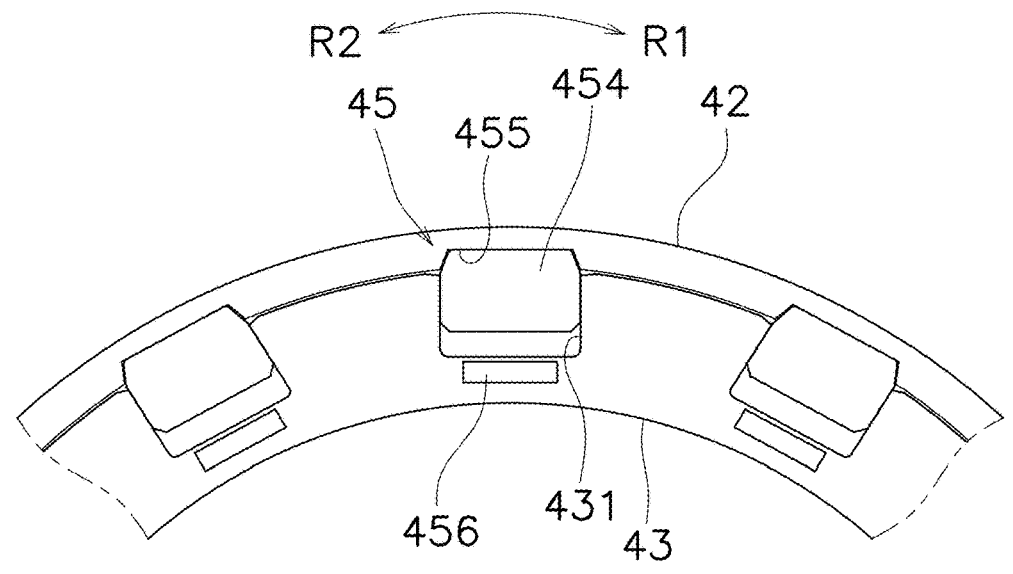
FIG. 5 is an enlarged view of the portion of the first clutch (set in an engaged state).

According to the first clutch 45 configured as described above, when the output member 43 is rotated at a speed greater than a predetermined value, as shown in FIG. 5, the centrifugal elements 454 are moved radially outward by the centrifugal forces and are engaged with the engaged grooves 455, respectively. In other words, the first clutch 45 is turned to the engaged state. As a result, the input member 42 and the output member 43 are rotated unitarily with each other.

In contrast, when the output member 43 is rotated at a speed of less than or equal to the predetermined value, as shown in FIG. 4, each centrifugal element 454 is moved radially inward not only due to the slant of the pair of inner wall surfaces 455a and 455b but also due to the magnetic force of each magnet 456, whereby each centrifugal element 454 and each engaged groove 455 are disengaged from each other. In other words, the first clutch 45 is turned to the disengaged state. As a result, the input member 42 and the output member 43 are made rotatable relative to each other.

Selectable One-way Clutch

As shown in FIG. 2, the selectable one-way clutch 46 is disposed between the sun gear 411 and the stationary housing 44.

Figure 6:
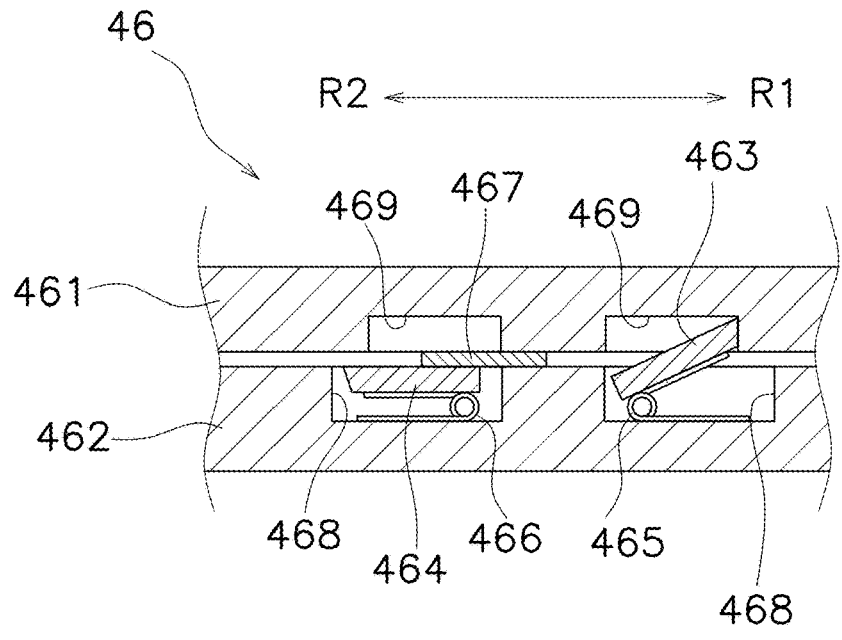
FIG. 6 is a schematic diagram illustrating a selectable one-way clutch operating in a first operating mode.
Figure 7:
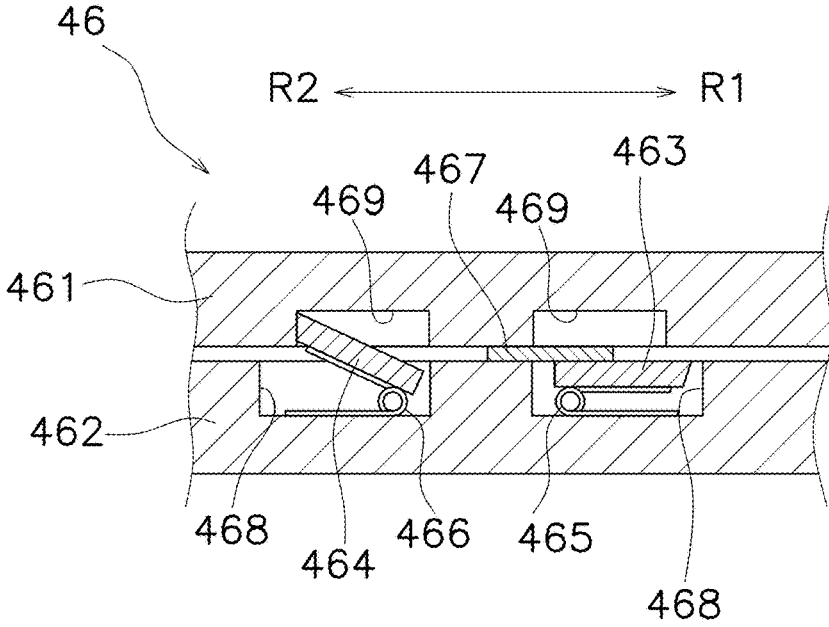
FIG. 7 is a schematic diagram illustrating the selectable one-way clutch operating in a second operating mode.

As shown in FIGS. 6 and 7, the selectable one-way clutch 46 operates in a first operating mode and a second operating mode. FIG. 6 is a schematic diagram of the selectable one-way clutch 46 operating in the first operating mode, whereas FIG. 7 is a schematic diagram of the selectable one-way clutch 46 operating in the second operating mode.

When operating in the first operating mode, the selectable one-way clutch 46 allows the sun gear 411 to rotate in the forward moving rotational direction R1 but prevents the sun gear 411 from rotating in the rearward moving rotational direction R2. In contrast, when operating in the second operating mode, the selectable one-way clutch 46 allows the sun gear 411 to rotate in the rearward moving rotational direction R2 but prevents the sun gear 411 from rotating in the forward moving rotational direction R1.

For example, the selectable one-way clutch 46 can be configured as follows, albeit not particularly limited thereto. The selectable one-way clutch 46 includes an outer race 461, an inner race 462, a first engaging member 463, a second engaging member 464, a first urging member 465, a second urging member 466, and a selector member 467.

The outer race 461 is fixed to the sun gear 411. The outer race 461 is rotated unitarily with the sun gear 411. The inner race 462 is fixed to the stationary housing 44. The outer race 461 and the inner race 462 are rotatable relative to each other. It should be noted that the inner race 462 is fixed to the stationary housing 44 and is thereby made non-rotatable.

The first and second engaging members 463 and 464 are attached to the inner race 462. When described in detail, the inner race 462 is provided with a plurality of accommodation portions 468 on the outer peripheral surface thereof. The first and second engaging members 463 and 464 are accommodated in the accommodation portions 468, respectively.

The first urging member 465 urges the first engaging member 463 toward the outer race 461; likewise, the second urging member 466 urges the second engaging member 464 toward the outer race 461. When described in detail, the first urging member 465 urges the forward moving rotational direction R1-side end of the first engaging member 463 toward the outer race 461. The second urging member 466 urges the rearward moving rotational direction R2-side end of the second engaging member 464 toward the outer race 461. The first and second urging members 465 and 466 may, for instance, be torsion springs.

The outer race 461 is provided with a plurality of engaged grooves 469 on the inner peripheral surface thereof. The forward moving rotational direction R1-side end of the first engaging member 463 and the rearward moving rotational direction R2-side end of the second engaging member 464 are engaged with the engaged grooves 469.

As shown in FIG. 6, when the first engaging member 463 is engaged with one of the engaged grooves 469, the outer race 461 is made rotatable in the forward moving rotational direction R1 but is made non-rotatable in the rearward moving rotational direction R2. In contrast, as shown in FIG. 7, when the second engaging member 464 is engaged with the other of the engaged grooves 469, the outer race 461 is made rotatable in the rearward moving rotational direction R2 but is made non-rotatable in the forward moving rotational direction R1.

The selector member 467 is non-rotatable together with the inner race 462. It should be noted that the selector member 467 is rotatable relative to the inner race 462 within a predetermined range. The selector member 467 is rotatable relative to the inner race 462 between a position that the selector member 467 prevents the first engaging member 463 from moving toward the outer race 461 and a position that the selector member 467 prevents the second engaging member 464 from moving toward the outer race 461. The selector member 467 is changed in position by, for instance, an actuator 104 (see FIG. 2) such as an electric motor.

When the selectable one-way clutch 46 operates in the first operating mode, as shown in FIG. 6, the selector member 467 prevents the second engaging member 464 from moving toward the outer race 461. As a result, only the first engaging member 463 is engaged with the one engaged groove 469, whereby the outer race 461 is made rotatable in the forward moving rotational direction R1 but is made non-rotatable in the rearward moving rotational direction R2. In other words, when operating in the first operating mode, the selectable one-way clutch 46 allows the sun gear 411 to rotate in the forward moving rotational direction R1 but prevents the sun gear 411 from rotating in the rearward moving rotational direction R2.

In contrast, when the selectable one-way clutch 46 operates in the second operating mode, as shown in FIG. 7, the selector member 467 prevents the first engaging member 463 from moving toward the outer race 461. As a result, only the second engaging member 464 is engaged with the other engaged groove 469, whereby the outer race 461 is made rotatable in the rearward moving rotational direction R2 but is made non-rotatable in the forward moving rotational direction R1. In other words, when operating in the second operating mode, the selectable one-way clutch 46 allows the sun gear 411 to rotate in the rearward moving rotational direction R2 but prevents the sun gear 411 from rotating in the forward moving rotational direction R1.

Controller

As illustrated in FIGS. 1 and 2, the controller 5 is configured to control the electric motor 2 and the selectable one-way clutch 46. Specifically, the controller 5 is configured to control the actuator 104 to control the position of the selector member 467 in the selectable one-way clutch 46.

For example, a computer (e.g., microcomputer), including a CPU (Central Processing Unit), a ROM (Read Only Memory), and so forth, is provided as the controller 5. The ROM has stored programs for executing a variety of computations. The CPU executes the programs stored in the ROM.

Figure 8:
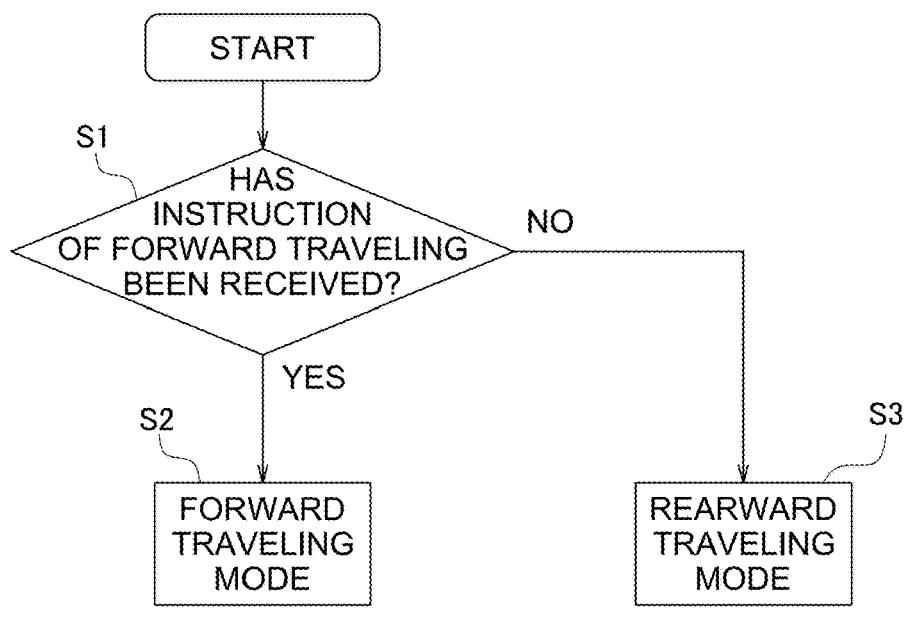
FIG. 8 is a flowchart illustrating a method of controlling by a controller.

The controller 5 executes a forward traveling mode and a rearward traveling mode. For example, as shown in FIG. 8, the controller 5 determines whether or not an instruction of forward traveling has been received from a driver (step S1). When it is determined that the instruction of forward traveling has been received (Yes in step S1), the controller 5 executes the forward traveling mode (step S2). On the other hand, when it is determined that the instruction of forward traveling has not been received, i.e., that an instruction of rearward traveling has been received (No in step S1), the controller 5 executes the rearward traveling mode (step S3).

When executing the forward traveling mode, the controller 5 causes the electric motor 2 to rotate in the forward moving rotational direction. Then, the controller 5 causes the selectable one-way clutch 46 to operate in the first operating mode.

The first clutch 45 is in the disengaged state when the rotational speed of the output member 43 is less than or equal to a predetermined value in the forward traveling mode; hence, as shown in FIG. 3, the ring gear 412 and the planet carrier 414 are rotated in the forward moving rotational direction R1 (clockwise in FIG. 3), while being rotatable relative to each other. The selectable one-way clutch 46 is operating in the first operating mode; hence, the sun gear 411 is made non-rotatable in the rearward moving rotational direction R2 (counterclockwise in FIG. 3) and is thereby kept in a standstill.

Based on the above, the planetary gear mechanism 41 transmits torque, inputted thereto from the input member 42, to the output member 43, while the torque is amplified in magnitude in the planetary gear mechanism 41. Additionally, the planetary gear mechanism 41 transmits mechanical power, inputted thereto from the input member 42, to the output member 43, while the mechanical power is reduced in rotational speed in the planetary gear mechanism 41.

The first clutch 45 is turned to the engaged state when the rotational speed of the output member 43 becomes greater than the predetermined value due to increase in rotational speed of the electric motor 2 in the forward traveling mode; hence, the ring gear 412 and the planet carrier 414 are unitarily rotated in the forward moving rotational direction R1. The selectable one-way clutch 46 is operating in the first operating mode; hence, the sun gear 411 is rotated in the forward moving rotational direction R1.

Based on the above, the planetary gear mechanism 41 transmits mechanical power, inputted thereto from the input member 42, to the output member 43, while the mechanical power is not reduced in rotational speed in the planetary gear mechanism 41.

When executing the rearward traveling mode, the controller 5 causes the electric motor 2 to rotate in the rearward moving rotational direction. Then, the controller 5 causes the selectable one-way clutch 46 to operate in the second operating mode.

In general, the rotational speed of the output member 43 is less than or equal to the predetermined value in the rearward traveling mode; hence, the first clutch 45 is in the disengaged state. Therefore, the ring gear 412 and the planet carrier 414 are rotated in the rearward moving rotational direction R2, while being rotatable relative to each other. The selectable one-way clutch 46 is operating in the second operating mode; hence, the sun gear 411 is made non-rotatable in the forward moving rotational direction R1 and is thereby kept in a standstill.

Based on the above, the planetary gear mechanism 41 transmits torque, inputted thereto from the input member 42, to the output member 43, while the torque is amplified in magnitude in the planetary gear mechanism 41. Additionally, the planetary gear mechanism 41 transmits mechanical power, inputted thereto from the input member 42, to the output member 43, while the mechanical power is reduced in rotational speed in the planetary gear mechanism 41.

As described above, a hydraulic pressure is not required for the drive unit 100 for both forward traveling and rearward traveling; hence, energy consumption is reduced.

Modifications

One preferred embodiment of the claimed invention has been explained above. However, the claimed invention is not limited to the above, and a variety of changes can be made without departing from the scope of the claimed invention. It should be noted that basically speaking, respective modifications to be described are applicable simultaneously.

Figure 9:
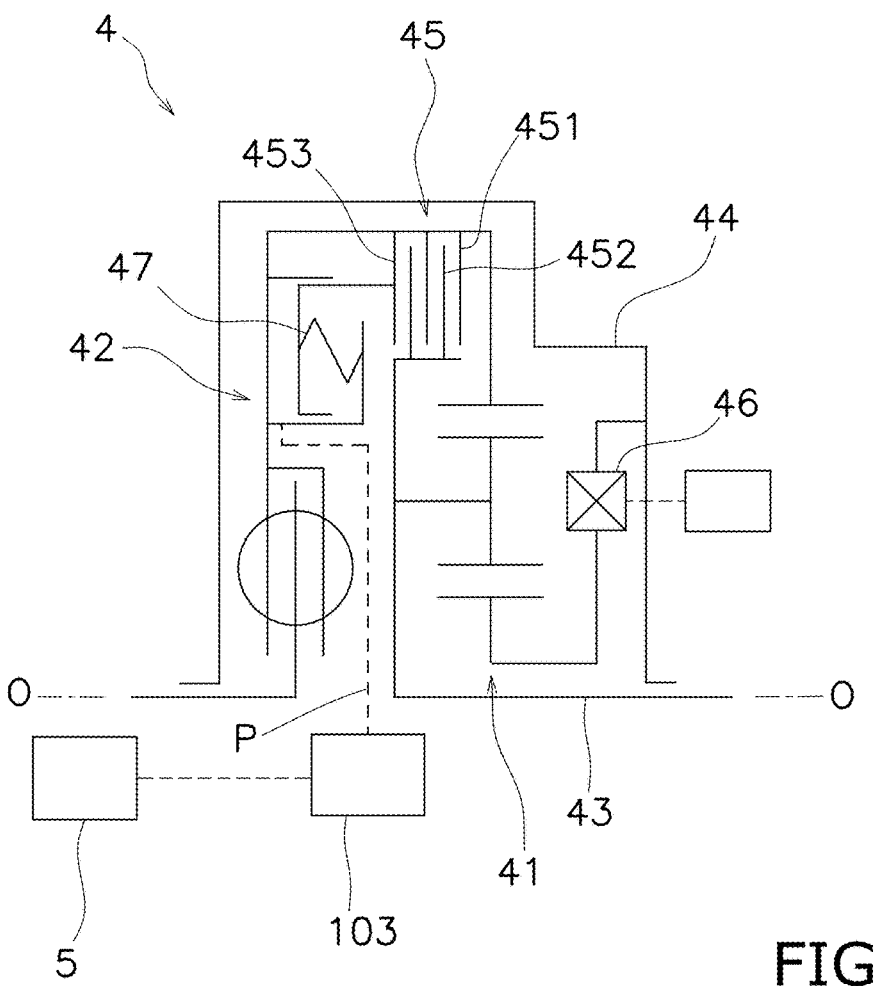
FIG. 9 is a schematic diagram of a transmission device according to a modification of the embodiment.

(a) As shown in FIG. 9, the first clutch 45 may be a multi-plate clutch. For example, the first clutch 45 includes a plurality of first clutch discs 451, a plurality of second clutch discs 452, and a piston 453. The first clutch discs 451 and the second clutch discs 452 are alternately disposed in the axial direction. Each adjacent pair of first and second clutch discs 451 and 452 interposes a friction material therebetween. The friction material may be attached to either of each adjacent pair of first and second clutch discs 451 and 452.

The first clutch discs 451 are attached to the input member 42, while being movable in the axial direction. Additionally, the first clutch discs 451 are rotated unitarily with the input member 42. The second clutch discs 452 are attached to the output member 43, while being movable in the axial direction. The second clutch discs 452 are rotated unitarily with the output member 43.

The piston 453 presses the first clutch discs 451 and the second clutch discs 452 such that the first clutch discs 451 and the second clutch discs 452 are engaged by friction with each other.

The first clutch 45 is in the disengaged state, while being urged by an urging member 47. The urging member 47 may, for instance, be a coil spring. The urging member 47 axially presses the piston 453 to separate the piston 453 from the first and second clutch discs 451 and 452. It should be noted that the first clutch 45 is turned to the engaged state when the piston 453 is axially moved against the urging force of the urging member 47 by the hydraulic pressure.

In this case, the controller 5 is configured to control the first clutch 45. When described in detail, the controller 5 controls a hydraulic unit 103 to control the first clutch 45. The hydraulic unit 103 may include, for instance, a hydraulic pump, a control valve, and so forth. The hydraulic unit 103 supplies the first clutch 45 with the hydraulic pressure via an oil pathway P.

Figure 10:
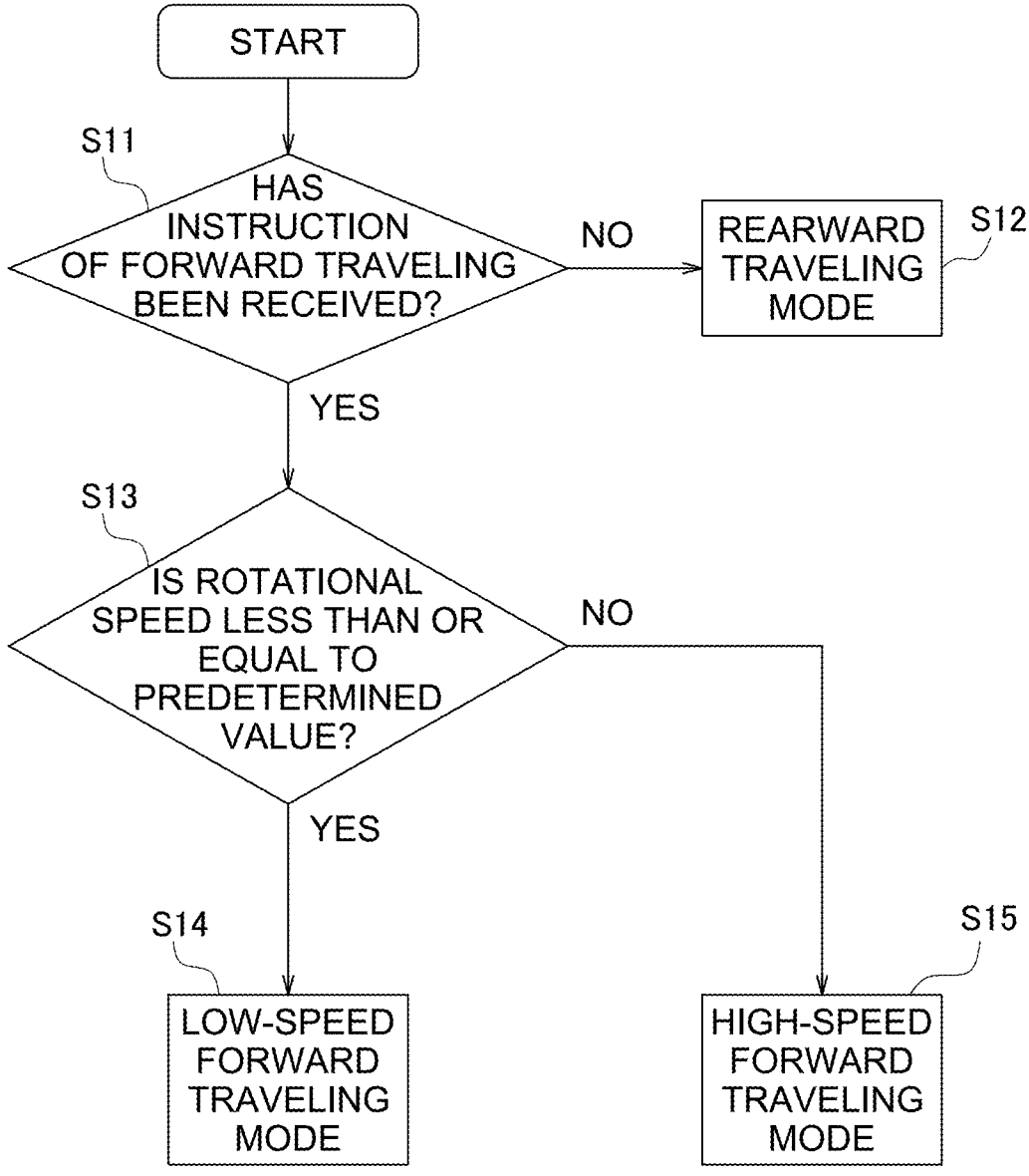
FIG. 10 is a flowchart showing a method of controlling by the controller according to the modification.

The controller 5 executes a low-speed forward traveling mode, a high-speed forward traveling mode, and a rearward traveling mode. For example, as shown in FIG. 10, the controller 5 determines whether or not an instruction of forward traveling has been received from a driver (step S11). When it is determined that the instruction of forward traveling has not been received, i.e., that an instruction of rearward traveling has been received (No in step S11), the controller 5 executes the rearward traveling mode (step S12).

On the other hand, when determining that the instruction of forward traveling has been received (Yes in step S11), the controller 5 next determines whether or not the rotational speed of the output member 43 is less than or equal to a predetermined value (step S13). When it is determined that the rotational speed of the output member 43 is less than or equal to the predetermined value (Yes in step S13), the controller 5 executes the low-speed forward traveling mode (step S14). When determining that the rotational speed of the output member 43 is not less than or equal to the predetermined value, i.e., that the rotational speed of the output member 43 is greater than the predetermined value (No in step S13), the controller 5 executes the high-speed forward traveling mode (step S15).

When executing the low-speed forward traveling mode, the controller 5 causes the electric motor 2 to rotate in the forward moving rotational direction. Then, the controller 5 turns the first clutch 45 to the disengaged state, while causing the selectable one-way clutch 46 to operate in the first operating mode. It should be noted that the first clutch 45 is disengaged without hydraulic pressure being applied to it; hence, the controller 5 controls the hydraulic unit 103 to stop supplying the first clutch 45 with the hydraulic pressure.

When executing the high-speed forward traveling mode, the controller 5 causes the electric motor 2 to rotate in the forward moving rotational direction. Then, the controller 5 turns the first clutch 45 to the engaged state, while causing the selectable one-way clutch 46 to operate in the first operating mode. When described in detail, the controller 5 controls the hydraulic unit 103 to supply the first clutch 45 with the hydraulic pressure, whereby the first clutch 45 is turned to the engaged state.

When executing the rearward traveling mode, the controller 5 causes the electric motor 2 to rotate in the rearward moving rotational direction. Then, the controller 5 turns the first clutch 45 to the disengaged state, while causing the selectable one-way clutch 46 to operate in the second operating mode.

Figure 11:
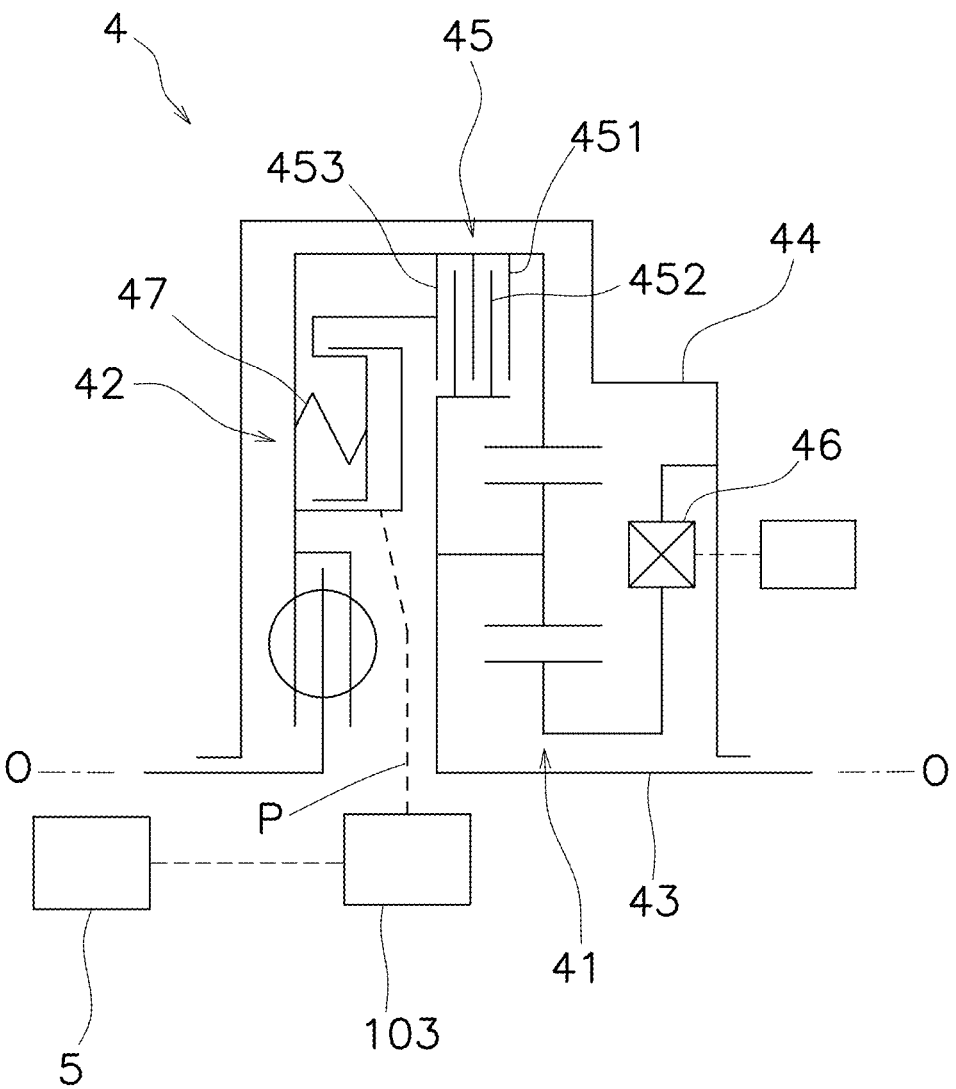
FIG. 11 is a schematic diagram of a transmission device according to another modification of the embodiment.

It should be noted that the first clutch 45, when made in the form of a multi-plate clutch, may be of a normally closed type as shown in FIG. 11. In other words, the urging member 47 may urge the first clutch 45 to turn the first clutch 45 to the engaged state.

Figure 12:
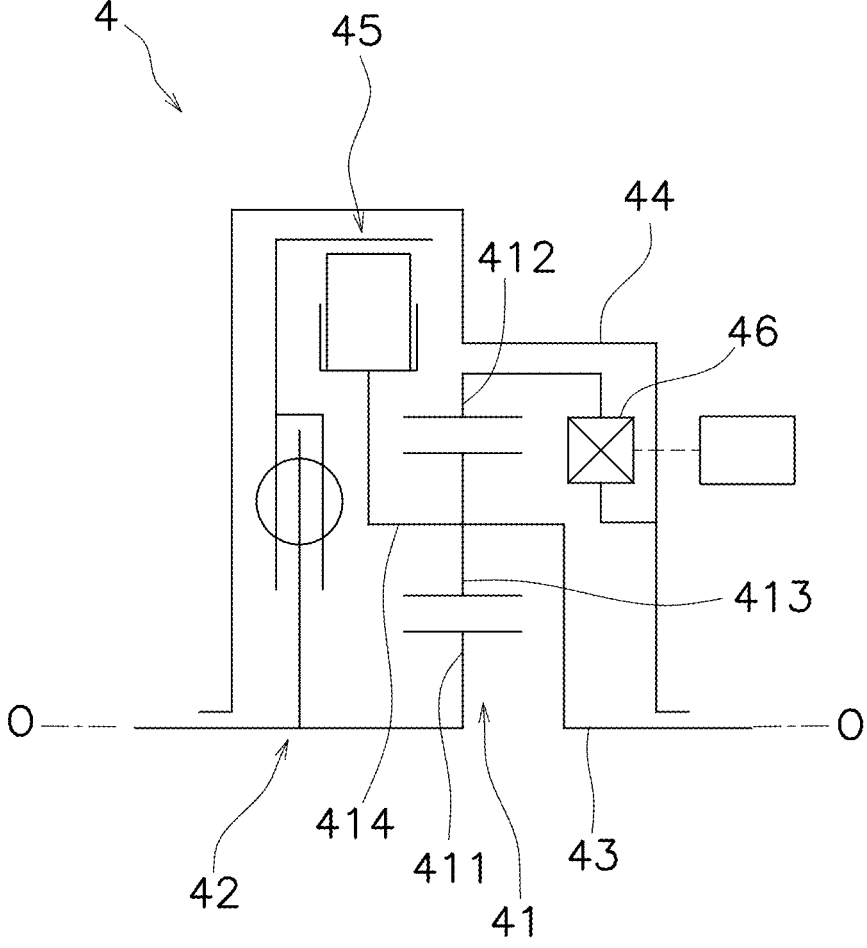
FIG. 12 is a schematic diagram of a transmission device according to yet another modification of the embodiment.

(b) As shown in FIG. 12, the input member 42 may be coupled to the sun gear 411. In this case, the selectable one-way clutch 46 is attached not to the sun gear 411 but to the ring gear 412. In other words, the selectable one-way clutch 46 is disposed between the ring gear 412 and the stationary housing 44.

When operating in the first operating mode, the selectable one-way clutch 46 is configured to allow the ring gear 412 to rotate in the forward moving rotational direction R1 but prevent the ring gear 412 from rotating in the rearward moving rotational direction R2. In contrast, when operating in the second operating mode, the selectable one-way clutch 46 is configured to allow the ring gear 412 to rotate in the rearward moving rotational direction R2 but prevent the ring gear 412 from rotating in the forward moving rotational direction R1.

(c) When operating in the second operating mode, the selectable one-way clutch 46 may prevent the sun gear 411 from rotating in the rearward moving rotational direction. In other words, when operating in the second operating mode, the selectable one-way clutch 46 may be configured to prevent the sun gear 411 from rotating in both the forward moving rotational direction R1 and the rearward moving rotational direction R2.

LIST OF REFERENCE NUMERALS

2: Electric motor, 4: Transmission device, 41: Planetary gear mechanism, 411: Sun gear, 412: Ring gear, 413: Planet gear, 414: Planet carrier, 42: Input member, 421: First input portion, 422: Second input portion, 423: Elastic member, 43: Output member, 44: Stationary housing, 45: First clutch, 454: Centrifugal element, 455: Engaged groove, 455*a*: Inner wall surface, 455*b*: Inner wall surface, 456: Magnet, 46: Selectable one-way clutch, 5: Controller, 100: Drive unit

The invention claimed is:

1. A drive unit comprising:
an electric motor;
a planetary gear mechanism including a sun gear, a planet gear, a ring gear, and a planet carrier;
an input member coupling the electric motor and one of the ring gear and the sun gear therethrough to each other;
an output member coupled to the planet carrier;
a first clutch coupling the input member and the output member therethrough to each other in a manner capable of decoupling the input member and the output member therethrough from each other;
a stationary member disposed to be non-rotatable;

a selectable one-way clutch disposed between the stationary member and the other of the ring gear and the sun gear; and
a controller executing a forward traveling mode and a rearward traveling mode, wherein
the selectable one-way clutch operates in a first operating mode and a second operating mode,
the selectable one-way clutch is configured to allow the other of the ring gear and the sun gear to rotate in a forward moving rotational direction but prevent the other of the ring gear and the sun gear from rotating in a rearward moving rotational direction when operating in the first operating mode, the selectable one-way clutch configured to prevent the other of the ring gear and the sun gear from rotating in the forward moving rotational direction when operating in the second operating mode,
the controller causes the electric motor to rotate in the forward moving rotational direction and causes the selectable one-way clutch to operate in the first operating mode when executing the forward traveling mode, and
the controller causes the electric motor to rotate in the rearward moving rotational direction and causes the selectable one-way clutch to operate in the second operating mode when executing the rearward traveling mode.

2. The drive unit according to claim 1, wherein the first clutch is a centrifugal clutch.

3. The drive unit according to claim 1, wherein the input member includes a first input portion, a second input portion, and an elastic member elastically coupling the first and second input portions therethrough to each other.

4. A drive unit comprising:
an electric motor;
a planetary gear mechanism including a sun gear, a planet gear, a ring gear, and a planet carrier;
an input member coupling the electric motor and one of the ring gear and the sun gear therethrough to each other;
an output member coupled to the planet carrier;
a first clutch coupling the input member and the output member therethrough to each other in a manner capable of decoupling the input member and the output member therethrough from each other, the first clutch being a centrifugal clutch;
a stationary member disposed to be non-rotatable; and
a selectable one-way clutch disposed between the stationary member and the other of the ring gear and the sun gear, wherein
the selectable one-way clutch operates in a first operating mode and a second operating mode,
the selectable one-way clutch is configured to allow the other of the ring gear and the sun gear to rotate in a forward moving rotational direction but prevent the other of the ring gear and the sun gear from rotating in a rearward moving rotational direction when operating in the first operating mode, the selectable one-way clutch configured to prevent the other of the ring gear and the sun gear from rotating in the forward moving rotational direction when operating in the second operating mode,
the input member is disposed radially outside the output member, and
the first clutch includes

13 a centrifugal element rotated unitarily with the output member, the centrifugal element disposed to be radially movable with respect to the output member, and an engaged groove provided on an inner peripheral surface of the input member, the engaged groove configured to be engaged with the centrifugal element.

5. The drive unit according to claim 4, wherein the first clutch further includes a magnet disposed radially inside the centrifugal element, the magnet attracting the centrifugal element by a magnetic force.

6. The drive unit according to claim 4, wherein the engaged groove includes a pair of inner wall surfaces circumferentially opposed to each other, and at least one of the pair of inner wall surfaces slants radially inward to gradually separate from the other of the pair of inner wall surfaces.

7. A transmission device configured to change a rotational speed of a mechanical power transmitted thereto from an electric motor, the transmission device comprising:

a planetary gear mechanism including a sun gear, a planet gear, a ring gear, and a planet carrier;

an input member coupling the electric motor and one of the ring gear and the sun gear therethrough to each other;

an output member coupled to the planet carrier;

a first clutch coupling the input member and the output member therethrough to each other in a manner capable of decoupling the input member and the output member therethrough from each other;

a stationary member disposed to be non-rotatable;

a selectable one-way clutch disposed between the stationary member and the other of the ring gear and the sun gear; and a controller executing a forward traveling mode and a rearward traveling mode, wherein the selectable one-way clutch operates in a first operating mode and a second operating mode, the selectable one-way clutch is configured to allow the other of the ring gear and the sun gear to rotate in a forward moving rotational direction but prevent the other of the ring gear and the sun gear from rotating in a rearward moving rotational direction when operating in the first operating mode, the selectable one-way clutch configured to prevent the other of the ring gear and the sun gear from rotating in the forward moving rotational direction when operating in the second operating mode, the controller causes the electric motor to rotate in the forward moving rotational direction and causes the selectable one-way clutch to operate in the first operating mode when executing the forward traveling mode, and the controller causes the electric motor to rotate in the rearward moving rotational direction and causes the selectable one-way clutch to operate in the second operating mode when executing the rearward traveling mode.

* * * * *